A. JENSEN.
STERILIZER AND DRIER.
APPLICATION FILED MAY 8, 1909.

958,133.

Patented May 17, 1910.
3 SHEETS—SHEET 1.

WITNESSES
Leon Boillot
Nellie B. Keating

INVENTOR,
A. Jensen
BY
J. M. Wright,
ATTORNEY

A. JENSEN.
STERILIZER AND DRIER.
APPLICATION FILED MAY 8, 1909.
958,133.
Patented May 17, 1910.
3 SHEETS—SHEET 2.
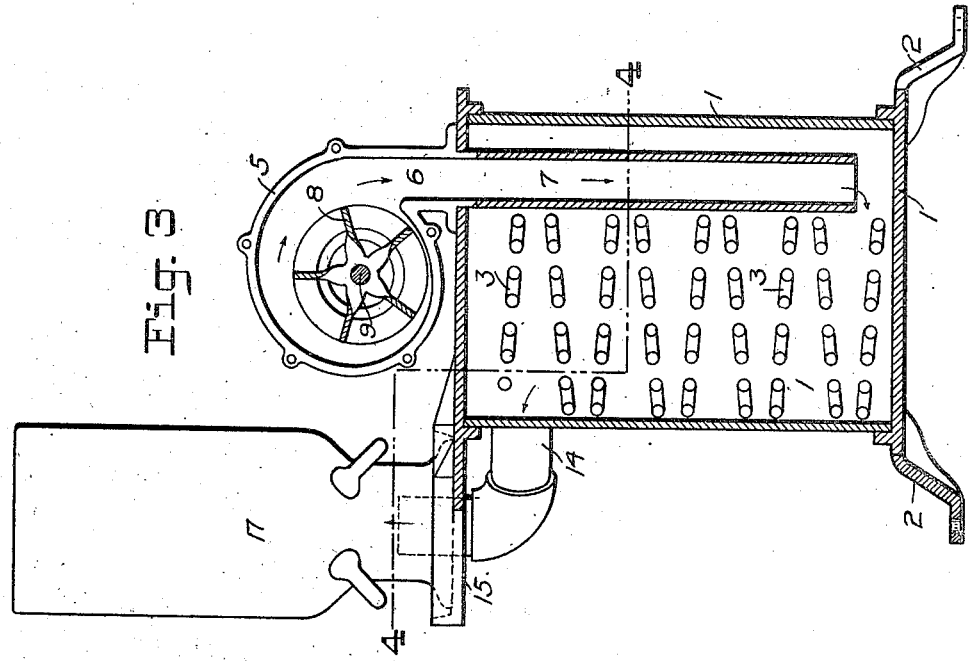
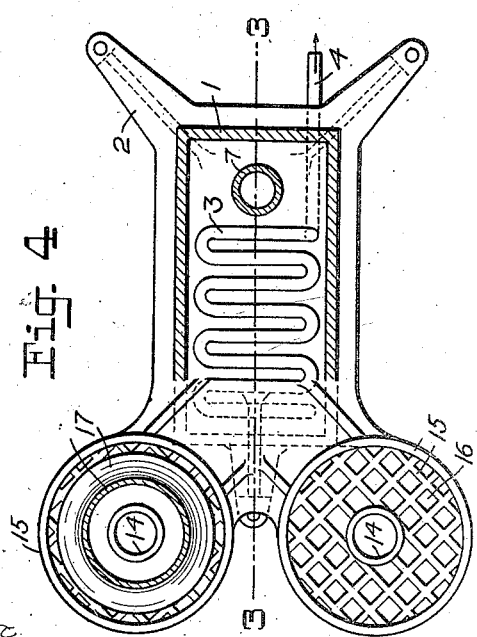
WITNESSES
*Leon Boiler*
*Nellie B. Keating*
INVENTOR
*A. Jensen*
BY
*Jm. Wright,*
ATTORNEY A. JENSEN.
STERILIZER AND DRIER.
APPLICATION FILED MAY 8, 1909.
958,133.
Patented May 17, 1910.
3 SHEETS—SHEET 3.
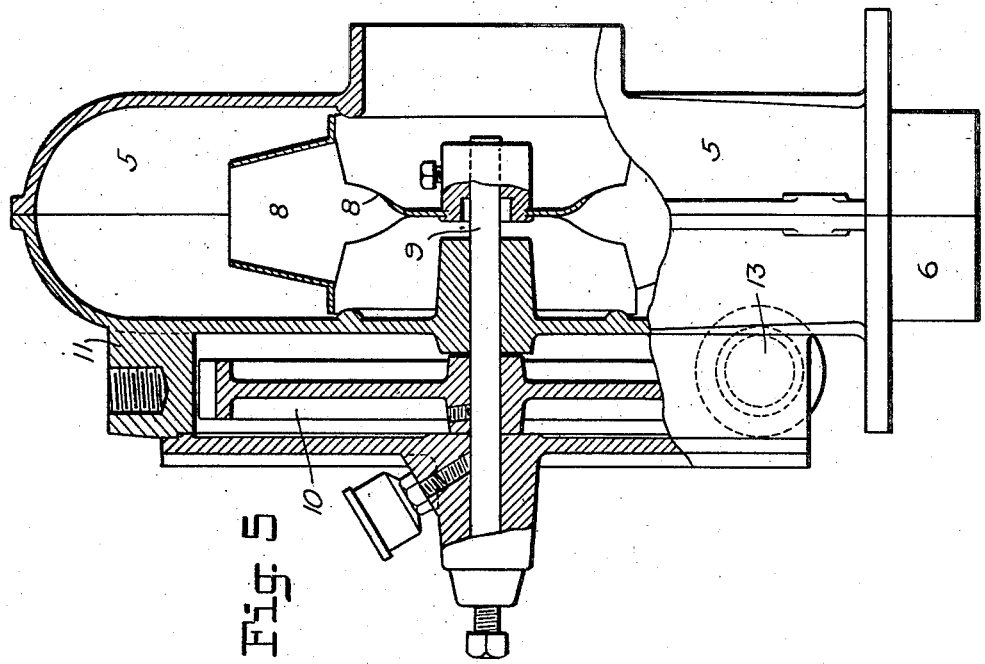
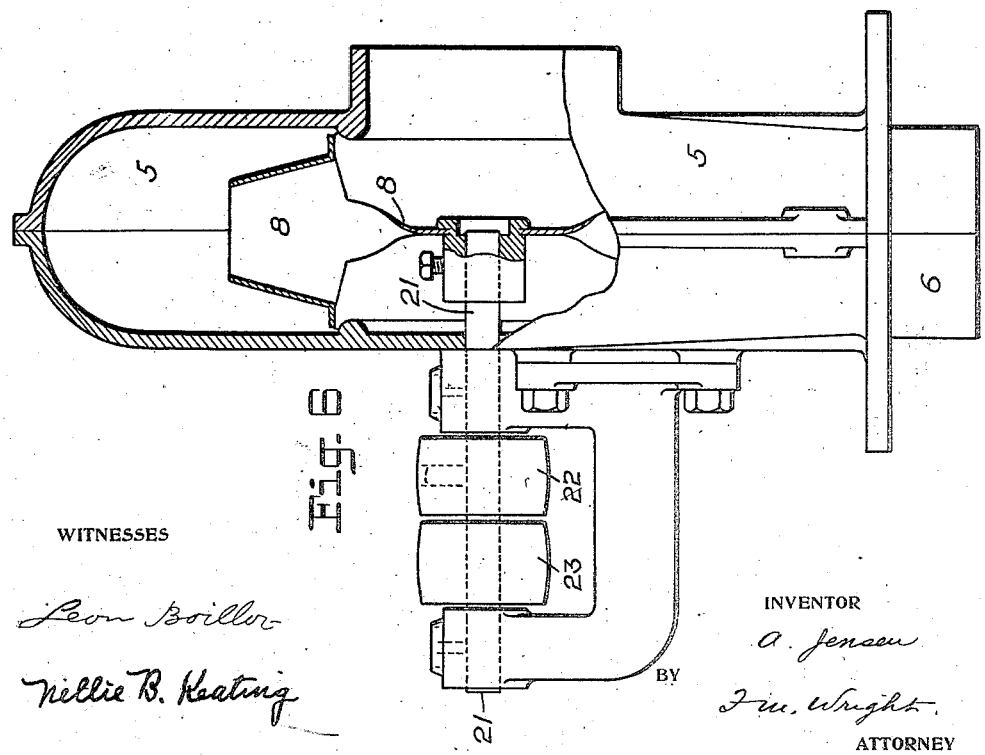
WITNESSES
INVENTOR
BY
ATTORNEY

UNITED STATES PATENT OFFICE.

AAGE JENSEN, OF EUREKA, CALIFORNIA.

STERILIZER AND DRIER.

958,133.  Specification of Letters Patent.  Patented May 17, 1910.

Application filed May 8, 1909. Serial No. 494,896.

*To all whom it may concern:*

Be it known that I, AAGE JENSEN, a citizen of the United States, residing at Eureka, in the county of Humboldt and State of California, have invented new and useful Improvements in Sterilizers and Driers, of which the following is a specification.

The object of the present invention is to provide an improved apparatus for sterilizing and drying by means of hot air.

In creameries, and in other places where food is prepared for transportation or for storage, it is of the greatest importance that the vessels for containing the food should be perfectly clean and thoroughly sterilized. Such cleansing and sterilization are effected by hot water and steam, and, in consequence, after the sterilization has been effected, there is great liability of condensation of moisture taking place, and the formation or collection of a small quantity of water in the vessel, which condition is favorable to the growth of bacteria. By not only sterilizing, the vessels, but by also rendering them perfectly dry, it is impossible for bacteria to develop.

Figure 1:
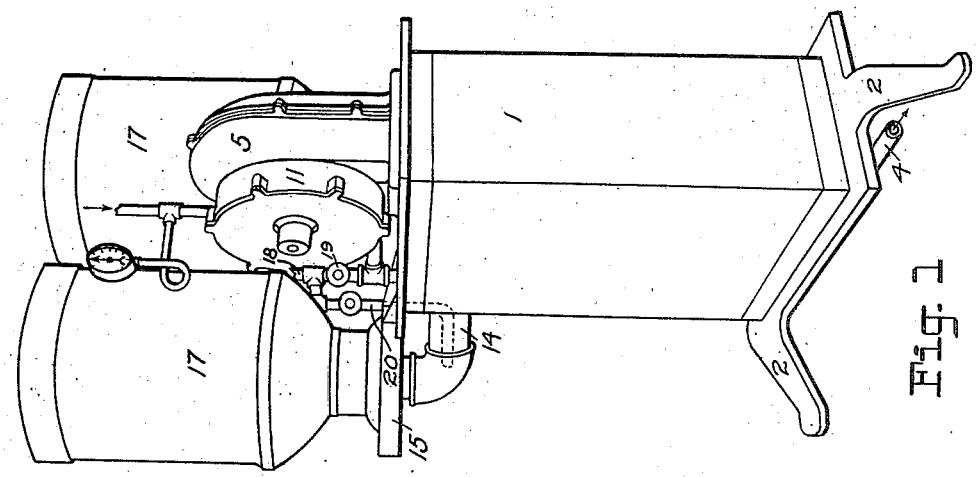
Figure 2:
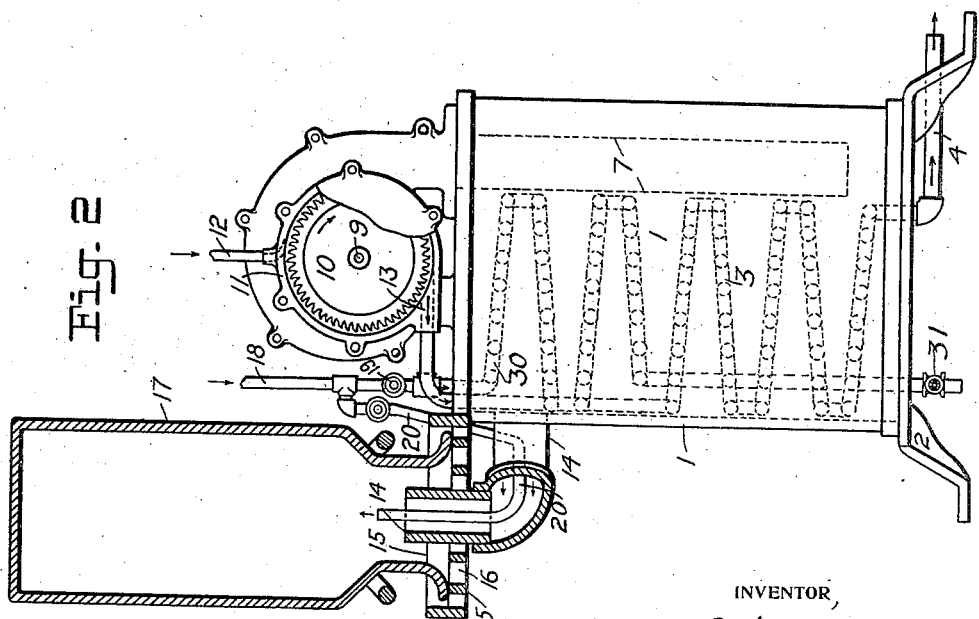

In the accompanying drawing, Figure 1 is a perspective view of my improved apparatus; Fig. 2 is a side view, partly in section, thereof; Fig. 3 is a longitudinal section on the line 3—3 of Fig. 4; Fig. 4 is a horizontal section on the line 4—4 of Fig. 3; Fig. 5 is an enlarged cross section of a blower and turbine; Fig. 6 is a similar view of the modified form thereof.

Referring to the drawing, 1 indicates a casing mounted on legs 2. In said casing is inclosed a pipe 3, having a large number of coils, and continually descending from the top to the bottom of the casing, so that, at no point thereof, is there any back pressure, or can any water collect in the coil. The lower end of the coil discharges through the bottom of the casing as shown at 4. Upon the top of the casing is mounted a blower 5 forcing air through a discharge passage 6 and into a pipe 7 leading to the bottom of the chamber 1 containing the coils. The fan 8 of said blower is mounted upon the shaft 9 of a steam driven turbine 10, the casing 11 of which turbine is formed integral with the casing of the blower. The steam for driving said turbine enters by an inlet 12 and escapes by an outlet 13, which connects with the top of the coil of pipe 3. From the side of the chamber 1 near its top pipes 14 lead through the middle of supporting plates 15 and extend upward above said plates to a suitable height. Said plates 15 are formed with apertures as shown at 16.

The operation of the apparatus is as follows:—The receptacles 17 to be dried are placed in an inverted position upon the supporting plates 15, so that pipes 14 extending upwardly through said plates extend into said receptacle. Steam being admitted by the steam inlet 12 in the turbine propels the turbine and, on escaping, enters the coil 3 and descends through the same, heating the chamber 1, and finally escaping at the bottom, at the point 4. The rotation of the turbine 10 impels the blower, and forces a current of air down to the bottom of the chamber 1, from which it ascends, being gradually heated by the coil 3 and is expelled with considerable force through pipes 14 and fills the interior of the receptacles 17 escaping through the openings 16 in the supporting plates 15.

In case a very high degree of heat is required live steam may be introduced into separate coils 30 by a pipe 18 controlled by a valve 19, the outlet at the lower end of said coils being contracted by a valve 31, which will permit of the escape of the water of condensation, while maintaining sufficiently high the pressure, and therefore the temperature, of the steam in said coils. From said pipe 18 pipes 20 may lead to the pipes 14, for the purpose of filling the receptacles with live steam to sterilize the same.

Instead of the blower being driven by a turbine it may, as shown in Fig. 6, be driven from a shaft 21 having fast and loose pulleys 22, 23, adapted to be driven by a belt.

The above construction possesses the advantages that it not only directly destroys bacteria, but, by removing all moisture from the receptacles, it deprives bacterial life of any subsistence. Moreover it prolongs the life of any metallic food containers, by leaving them absolutely dry, thereby preventing the corrosion caused by moisture.

The apparatus can be successfully used for the dry sterilization of milk receptacles and dry utensils in general, of bottles in breweries, drug stores, wineries, distilleries, and in fact, in any kind of receptacles for liquid or solid food.

The apparatus is self-regulating as to the amount of steam required for the purpose of heating the air, as, when a small amount of hot air is necessary, then the blower will be driven at a low speed, and therefore also the turbine will rotate at a low speed, and the amount of steam required will be correspondingly reduced. On the other hand, if an increased quantity of hot air is required, the turbine will be driven at a correspondingly high speed, and consequently the amount of steam escaping therefrom and utilized to heat the air will be proportionately increased.

I claim:—

1. The combination of a casing of a heating chamber, a blower supported thereon, arranged to impel air into said chamber, a perforated supporting plate secured to, and supported by, said casing, an air conduit leading from said casing through said perforated plate, and a steam coil within the casing, substantially as described.

2. The combination of a casing of a heating chamber, a blower supported thereon, an air pipe leading therefrom to the lower portion of said chamber for conducting air thereto, a perforated supporting plate secured to, and supported by, said casing, an air conduit leading from the top of said casing through said perforated plate, a steam turbine supported on said casing co-axially with said blower, a pipe for supplying live steam thereto, a steam coil in the upper part of said chamber connected with said pipe, and a steam coil in the lower part of the chamber connected with the exhaust from the turbine, substantially as described.

3. The combination of a casing of a heating chamber, a blower supported thereon, an air pipe leading therefrom to the lower portion of said chamber for conducting air thereto, a perforated supporting plate secured to, and supported by, said casing, an air conduit leading from the top of said casing through said perforated plate, a steam turbine supported on said casing co-axially with said blower, a pipe for supplying live steam thereto, a steam coil in the upper part of said chamber connected with said pipe, a steam coil in the lower part of the chamber connected with the exhaust from the turbine, and a steam pipe leading from the live steam supply pipe through said air conduit, substantially as described.

In testimony whereof I have hereunto set my hand in the presence of two subscribing witnesses.

AAGE JENSEN.

Witnesses:
J. M. NISSON,
FRANK NAZEO.